United States Patent
Asplund

[11] Patent Number: 6,151,765
[45] Date of Patent: Nov. 28, 2000

[54] METHOD FOR CONVERTING A FIXED SEAT BACK TO A SEAT BACK/CONSOLE

[76] Inventor: George T. Asplund, 1815 E. Maple, Enid, Okla. 73701

[21] Appl. No.: 09/317,727

[22] Filed: May 24, 1999

[51] Int. Cl.[7] .................................................. B21K 21/16
[52] U.S. Cl. .................. 29/401.1; 297/113; 297/440.16; 297/411.23
[58] Field of Search ............................... 297/113, 440.15, 297/440.16, 440.21, 440.2, 440.22, 411.27, 411.26, 411.3, 411.46, 411.45, 411.24, 411.23, 411.25; 29/401.1

[56] References Cited

U.S. PATENT DOCUMENTS

| | | |
|---|---|---|
| D. 283,217 | 4/1986 | Burnette et al. . |
| D. 315,131 | 3/1991 | Thurman . |
| D. 356,693 | 3/1995 | Meier . |
| 2,673,591 | 11/1954 | Cox . |
| 2,697,479 | 12/1954 | Fesler ................................. 297/411.25 |
| 4,106,829 | 8/1978 | Dolle et al. . |
| 4,575,152 | 3/1986 | McLaughlin ........................ 297/411.46 |
| 5,205,452 | 4/1993 | Mankey . |
| 5,275,466 | 1/1994 | Rentchler, Jr. . |
| 5,540,479 | 7/1996 | Thomas et al. ........................... 297/113 |
| 5,803,415 | 9/1998 | Konishi et al. ..................... 297/411.26 |

*Primary Examiner*—S. Thomas Hughes
*Assistant Examiner*—Steven A Blount
*Attorney, Agent, or Firm*—Edward L. White

[57] ABSTRACT

The present invention provides a method and apparatus for converting a fixed middle portion of a vehicle seat into a selectable seat back or arm rest. The apparatus is a "t-bar" which is inserted into the hollow tubing which supports the seat back. Once the t-bar is inserted, one leg is inserted into the remaining tubing sticking up from the lower seat portion to place the seat back in an upright position; another leg of the t-bar is inserted into the upright tubing to place the seat back in the arm rest position. A method is provided for converting the fixed seat back into a selectable upright or arm rest type device.

2 Claims, 4 Drawing Sheets

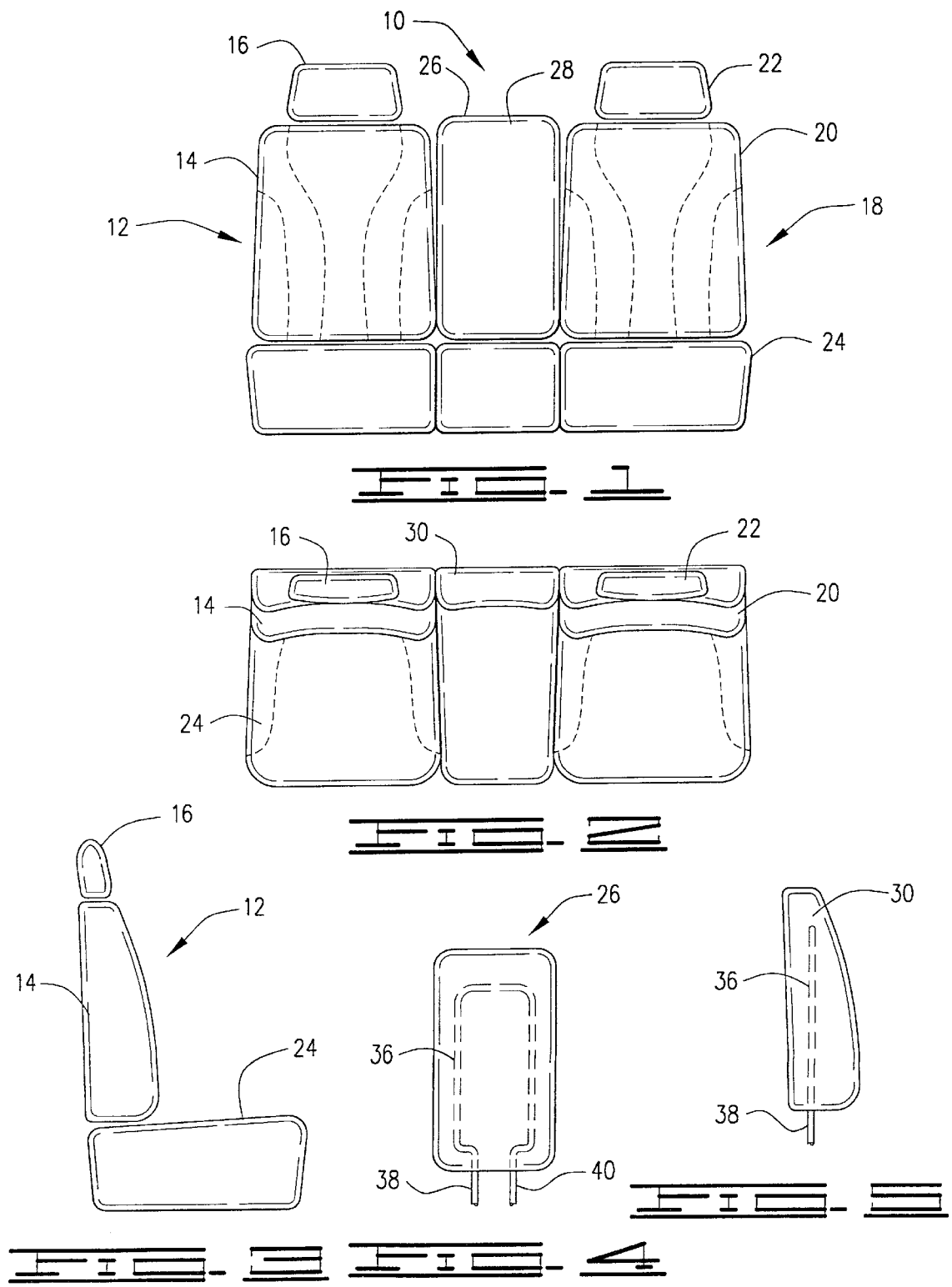

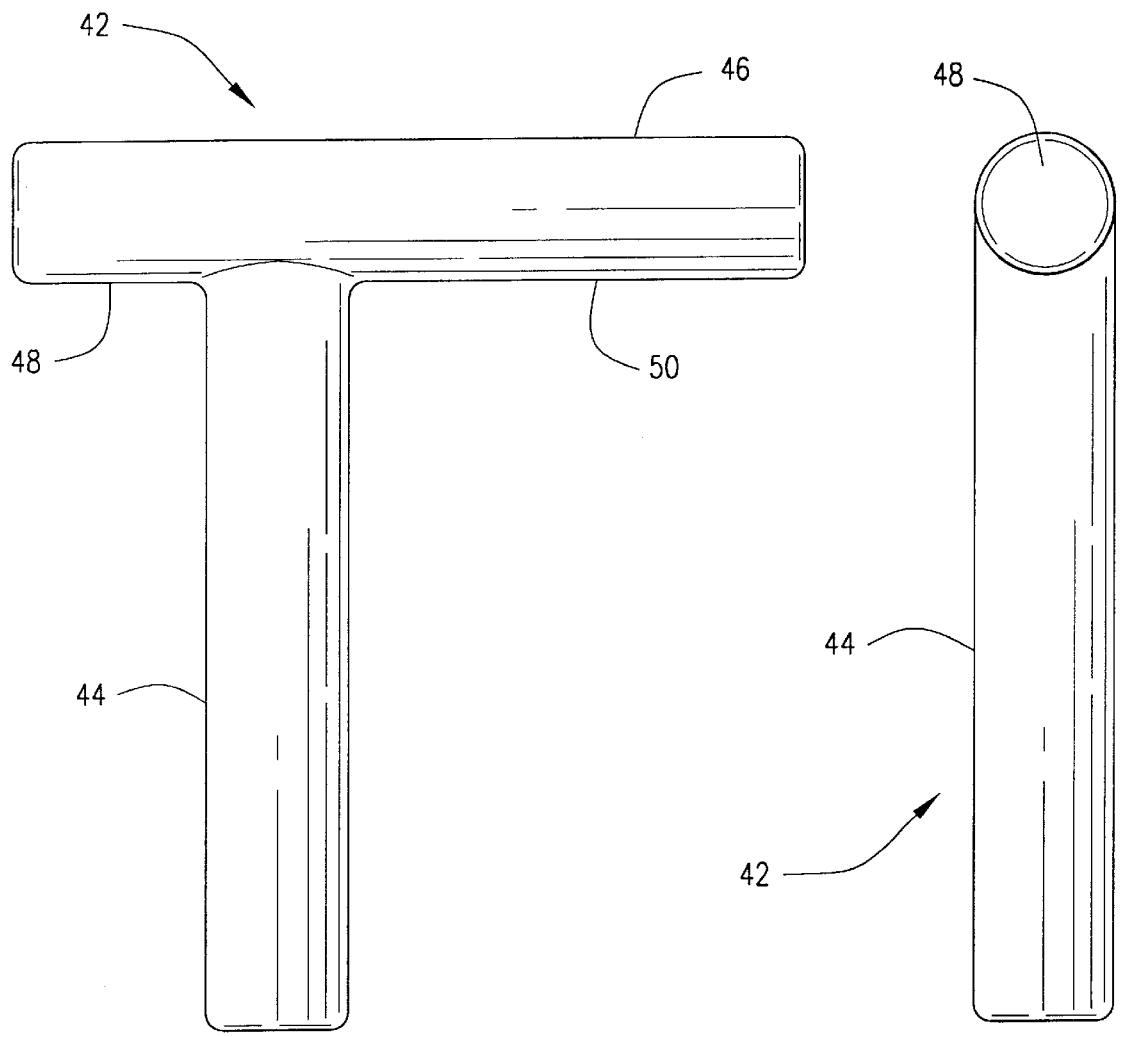

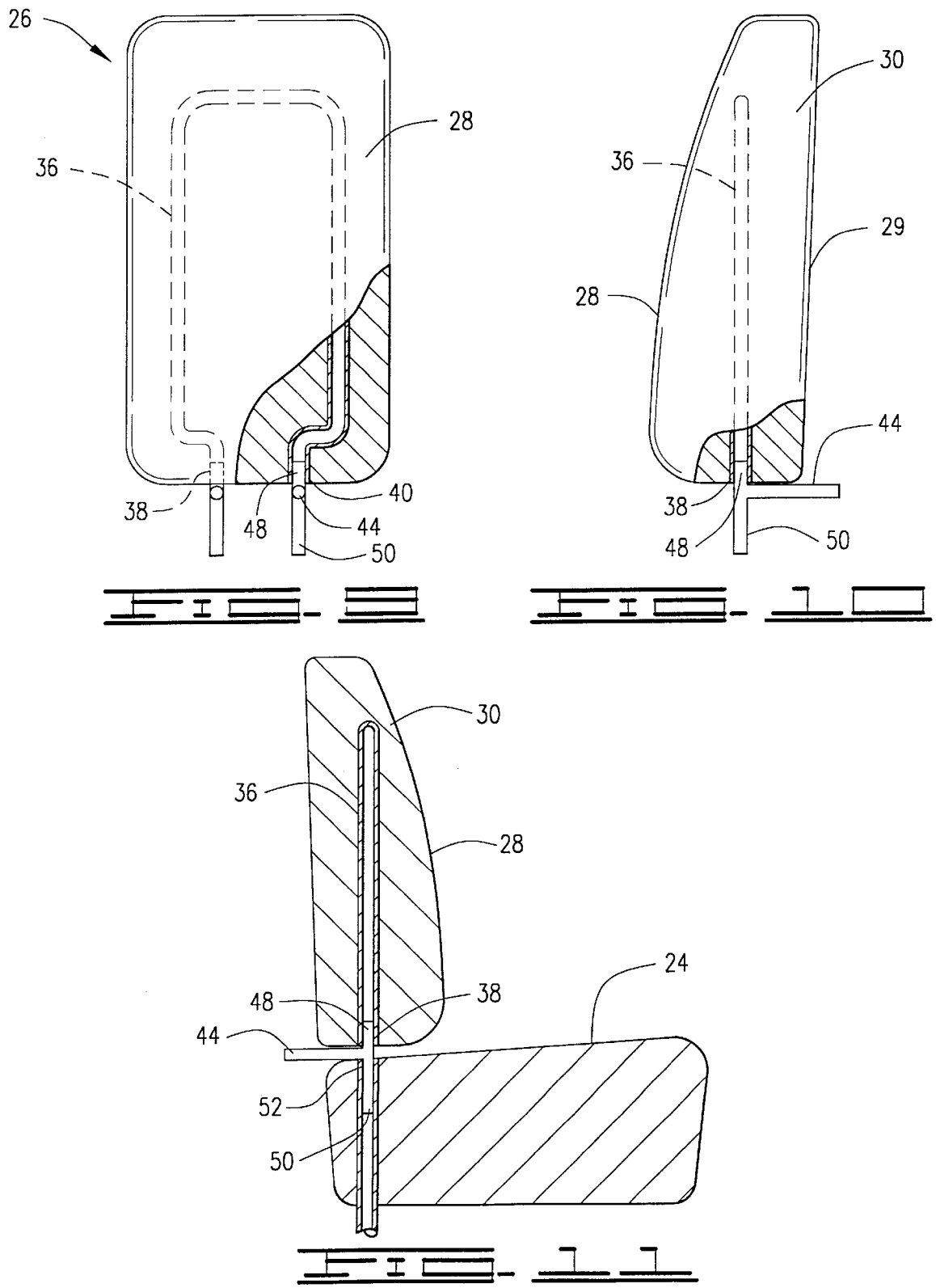

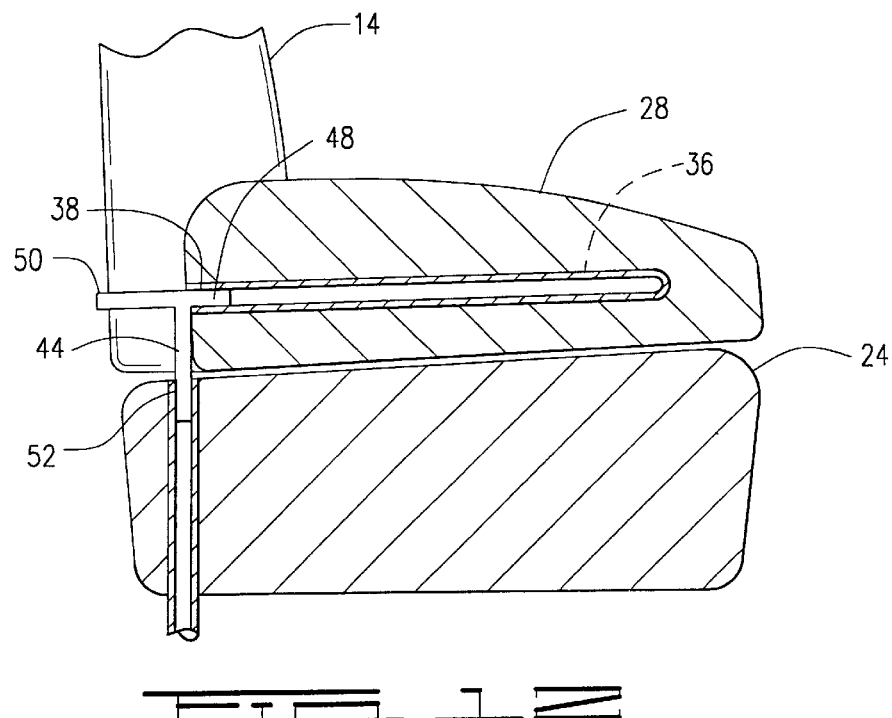
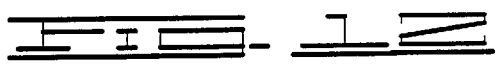
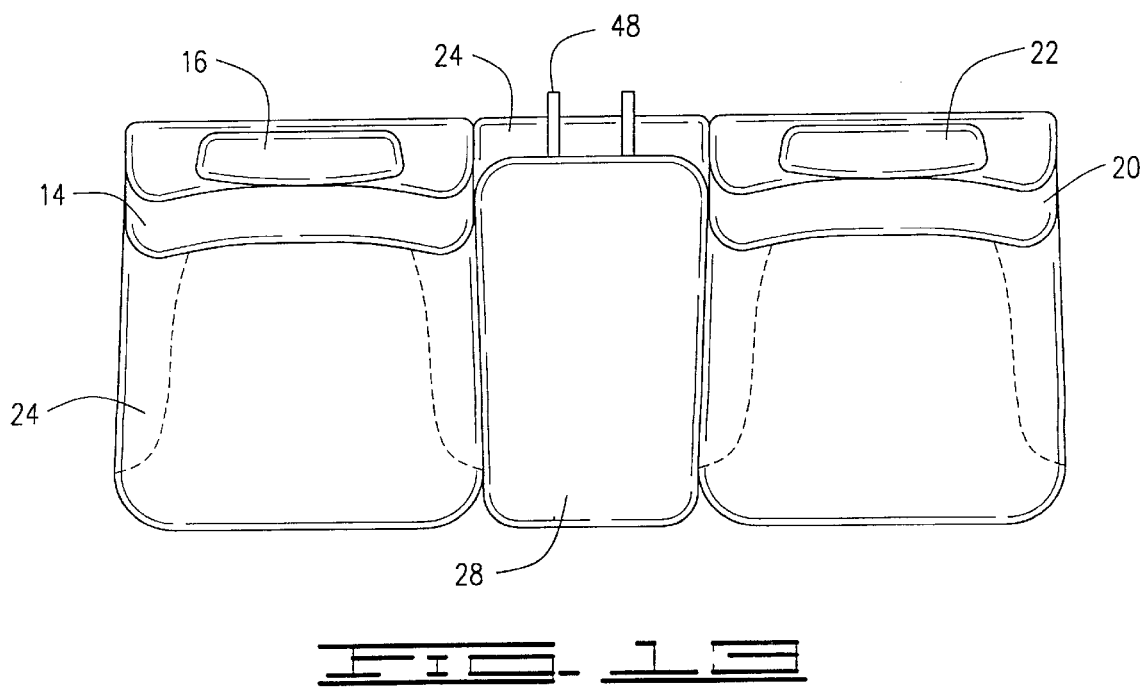

METHOD FOR CONVERTING A FIXED SEAT BACK TO A SEAT BACK/CONSOLE

CROSS REFERENCES TO RELATED APPLICATIONS

None.

BACKGROUND OF THE INVENTION a. Field of the Invention

The invention relates to seating devices for vehicles. More particularly, the present invention relates to methods and apparatus for converting vehicle seats as they are provided by the manufacturer into alternative forms. In particular, it is an object of the present invention to provide an apparatus and method for converting a middle section of a vehicle seat from a fixed backrest into a convertible back rest/arm rest.

b. Description of the Prior Art

It is well known that a seat back portion between the driver's seat and a passenger's seat in a vehicle can be converted into a console-type device. U.S. Des. Pat. No. 356,693 to Meier, illustrates a combined truck seat, center console, and cup holder unit. Many vehicles are provided from the factory with such seat backs which are capable of conversion to a console.

However, some vehicles are provided with a fixed seat back. Manufacturers provide this as an option to allow customers to purchase vehicles at lower costs. They often require customers to purchase a more expensive seating package to obtain the desired seat which is convertible from a seat back to a console unit. The present device addresses this issue without requiring removal of the entire original equipment seating set up. Replacement of the entire original equipment seating surface is expensive and time consuming.

SUMMARY OF THE INVENTION

In view of the foregoing disadvantages inherent in the known types of seating devices for vehicles, it is an object of the invention to provide an apparatus and method which overcomes the various disadvantages of the prior art.

It is therefore an object of the invention to provide an apparatus and method for converting the factory vehicle seating surfaces from a fixed center rear seat portion to one that is reversibly convertible to either a seat back or a console.

It is a further object of the invention to provide an apparatus and method for accomplishing that objective which is both inexpensive and simple. Accordingly, an apparatus and method are described herein for simply and efficiently converting a fixed center seat portion to a selectable console/center seat portion.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

BRIEF DESCRIPTION OF THE DRAWINGS

The invention will be better understood and the objects other than those set forth above will become apparent when consideration is given to the following detailed description thereof. Such description make reference to the annexed drawings wherein:

FIG. 1 is a front view of a vehicle seat incorporating a fixed middle section.

FIG. 2 is a top view of a vehicle seat incorporating a fixed middle section.

FIG. 3 is a side of a vehicle seat incorporating a fixed middle section.

FIG. 4 is a front view of the fixed middle section, showing the tubular support member incorporated therein.

FIG. 5 is a side view of the fixed middle section, showing the tubular support member incorporated therein.

FIG. 6 is front view of the apparatus used to accomplish the present invention.

FIG. 7; is side view of the apparatus used to accomplish the present invention.

FIG. 8 is a bottom view of the apparatus used to accomplish the present invention.

FIG. 9 is a back view of the fixed middle section with the apparatus used to accomplish the present invention operated therein.

FIG. 10 is a side view of the fixed middle section with the apparatus used to accomplish the present invention operated therein.

FIG. 11 is a side view of the fixed middle section attached to the seating surface using the apparatus used to accomplish the present invention.

FIG. 12 is a side view of the fixed middle section attached to the lower surface using the apparatus, the fixed middle section being shown in a second position.

FIG. 13 is a top view of the fixed middle section incorporated in a vehicle seat using the apparatus, again the fixed middle section in the second position.

DETAILED DESCRIPTION OF PREFERRED EMBODIMENTS

Referring now to the drawings, where like numerals represent like or parts, vehicle seats 10 of the type in which the present invention is used are illustrated generally in FIGS. 1, 2, and 3. A passenger seat 12 having a back portion 14 and a headrest 16 adjoins a middle section 26 which is adjoined by a driver's seat 18 having a back portion 20 and a headrest 22. A seating surface 24 is located near a lower portion of the above-noted seating surface 24. A middle section 26 is fixed. It has a front surface 28 and a back surface 29. It also has sides 30 and a lower surface 32. Generally, the front and back surfaces 28 and 29, the sides and the lower surface 30 and 32, respectively, cooperate to define a cavity therein which is filled with stuffing 34. The stuffing 34 is shown in the partial cross-sectional view in FIG. 9. Generally, the front surface 28 is comprised of a material matching the seating surface 24 on the passenger and driver seat. The back surface 29 is generally comprised of a vinyl material, or other material not matching the seating surface 24. The middle section 26 is supported by a tubular support member 36. A first protruding tube 38 and a second protruding tube 40 extend outwardly through the lower surface 32 of the middle section 26 the first and second protruding tubes 38 and 40, to be referred to as the support means hereinafter. The arrangement of the tubular support member 36 is generally illustrated in FIGS. 4 and 5.

The apparatus, a "t-bar" 42 used to accomplished the present invention is illustrated generally in FIGS. 6 through 8. The t-bar 42 is comprised of an elongate leg 44, and a cross leg 46 having a shorter portion 48 and a longer portion 50. The diameter of the elongate leg 44 and the cross leg 46 are identical and are such that they are able to be removably received within the tubular support member 36 as it is cut. FIGS. 9 and 10 show the installation of the t-bar 42 into the tubular support member 36. The shorter portion 48 is inserted into a first protruding tube 38 and a second protruding tube 40. This leaves the longer portion 50 protruding from the first and second protruding tubes 38 and 40, in a direction parallel to that of the tubular support member 36. The elongate leg 44 is protruding in a direction perpendicular to that of the tubular support member 36. The elongate leg 44 extends beyond the back surface 29.

The placement of the middle section 26 in the upright position is illustrated in FIG. 11. For placement in the upright position, the longer portion 50 is inserted into a third protruding tube 52 and a fourth protruding tube 54 extending upwardly from the seating surface 24. The elongate leg 44 extends outwardly through the back of the seat. The placement of the middle section 26 in the down position is illustrated in FIGS. 12 and 13. The elongate leg 44 is inserted into the third and fourth protruding tubes, 52 and 54. This allows the middle section 26 to be laid down on the seating surface 24. Thus, the front surface 28 of the middle section becomes an arm rest.

OPERATION

In operation, the present invention must first be installed. The first step to installing the present invention is cutting the first and second protruding tubes, 38 and 40, as they extend beyond the lower surface 32 of the middle section 26. These tubes can be cut with tubing cutters, saws, or the like. The cutting of the tubular support member 36 creates the first and second protruding tubes, 38 and 40, with open ends extending beyond the lower surface 32. The cutting also creates a third and fourth protruding tubes, 52 and 54, extending upwardly from the seating surface 24. Preferably, the t-bar 42 is then permanently installed into the first and second protruding tubes, 38 and 40. A t-bar 42 is installed into each. The shorter portion 48 is pushed into the protruding tube. The shorter portion 48 is then permanently attached to the protruding tubes 38 and 40 by welding, gluing or the like. This permanently affixes the t-bar 42 in place on the middle section. The elongate leg 44 has been set so that it extends in a direction perpendicular to and beyond the back surface 29. In order to insure that the t-bars are in an appropriate position, it may be desirable to insert both elongate legs 44 into the third and fourth protruding tubes, 52 and 54, before welding the first and second protruding tubes, 38 and 40, to the shorter portion 48. Thus, it is insured that the spacing of the elongate legs 44 is accurate.

It may be required to accomplish the cutting of the tubular support member 36 to remove the front and back surface, and the stuffing from the middle section. If required, this step is incorporated herein by reference. It is a rather simple process of removing the fabric covering, then removing the stuffing. Once the tubing cut has been accomplished, the stuffing and fabric are then replaced.

With the t-bar 42 in place, the operation of the device is simple. A user simply pulls upwardly on the middle section to disengage the middle section from the third and fourth protruding tubes, 52 and 54. If it is desired to use the middle section 26 as a console, the elongate legs 44 are inserted into the third and fourth protruding tubes, 52 and 54. Alternatively, if it is desired to use the middle section as a seat back rest, the longer portions 50 are inserted into the third and fourth protruding tubes, 52 and 54.

Having thus described the field of the invention, the prior, the attached drawings, the summary of the invention, and the detailed description of the preferred embodiments, I claim:

1. A method for converting a fixed middle section of a vehicle seat into a convertible seat back/console, the method comprising the following steps:
   a. providing a vehicle seat which has a middle section affixed to it by a tubular support means for supporting the section;
   b. cutting the tubular support means, thereby separating the middle section from the remainder of the vehicle seat and exposing at least one protruding tube in both the middle section and the remainder of the vehicle seat from which the middle section was separated;
   c. providing a variable position means for selectively positioning the middle section into one of two positions relative to the remainder of the vehicle seat and attaching it to each protruding tube in the middle section,
   whereby, the middle section can function as either a seat back or a console in combination with the remainder of the vehicle seat, transforming a vehicle seat with a fixed middle section into one in which the middle section can function as either a back seat or a console.

2. The method of claim 1, wherein the variable position means comprises a t-bar having an elongate leg and a cross leg, the cross leg further having a shorter portion and a longer portion, the shorter portion being received within the tubular support means of the middle section such that the longer portion extends in a direction parallel to a plane created by the middle section of the seat and the elongate leg extends in a direction perpendicular to the plane created by the middle section, whereby, when the longer portion is inserted into the protruding tube in the remainder of the vehicle seat, the middle section serves as a seat back, and when the elongate leg is inserted into the protruding tube in the remainder of the vehicle seat, the middle section serves as a console.

* * * * *